Nov. 11, 1930.      F. D. HOWE      1,780,922
AXLE CONSTRUCTION
Filed Oct. 15, 1923      3 Sheets-Sheet 1
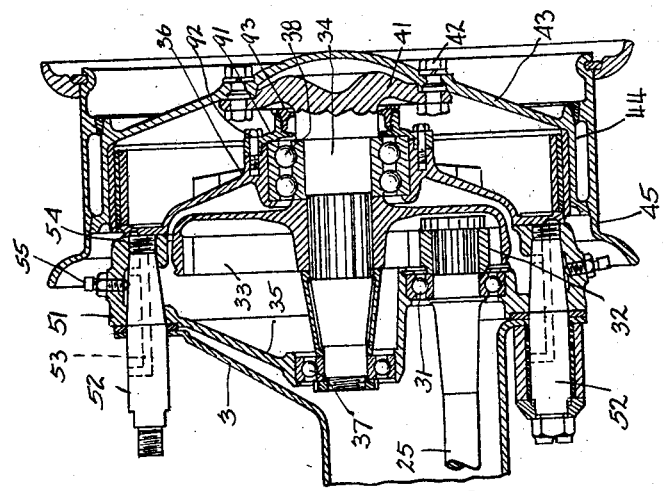
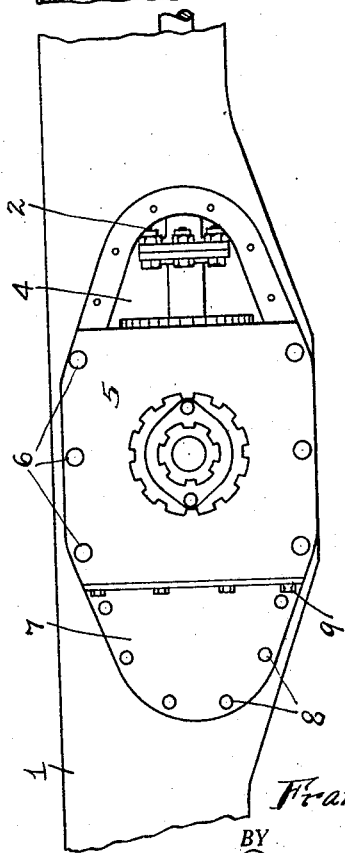
Fig. 1
INVENTOR.
Frank D. Howe
BY
Fay, Oberlin & Fay
ATTORNEYS Nov. 11, 1930.  F. D. HOWE  1,780,922
AXLE CONSTRUCTION
Filed Oct. 15, 1923  3 Sheets-Sheet 3

INVENTOR.
Frank D. Howe
BY
Fay, Oberlin & Fay
ATTORNEYS

Patented Nov. 11, 1930

1,780,922

UNITED STATES PATENT OFFICE

FRANK D. HOWE, OF CUYAHOGA FALLS, OHIO

AXLE CONSTRUCTION

Application filed October 15, 1923. Serial No. 668,525.

This invention relates to an axle construction. More particularly it comprises a driving axle for a motor vehicle of a type especially useful for motor busses and similar vehicles in which a low floor combined with good road clearance is essential. The axle is of the double reduction type having a final reduction adjacent the wheels and is also adapted for use on vehicles having double driving axles such as are employed on six-wheel vehicles.

In connection with many driving axles heretofore described for use on busses it has been necessary to provide a high floor and it was found that a low center of gravity combined with sufficient spring action and ample road clearance could not be satisfactorily provided for. This is particularly true with respect to vehicles of the six-wheel type having double driving axles. In most of such vehicles it is proposed to drive through worm gears. This involves the positioning of the worm above or below the axle, necessitating a high floor in the adjacent body of the vehicle in one case or greatly reducing the road clearance in the other instance.

The object of the present invention is to obviate the disadvantages above outlined and to provide an axle having full road clearance and at the same time a top face located in approximately the plane of the wheel supporting axle shafts. Another object of the invention is to supply an axle having exceptional lubricating facilities and also having wholly enclosed interengaging parts, the elements of which are very rigidly supported and so disposed that extreme quietness of operation will result. A further object of the invention is to provide a driving axle construction which may be used when a plurality of driving axles is required without changing the height of the axle casing or in any way interfering with the road clearance. Further objects of the invention will appear in the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 2:
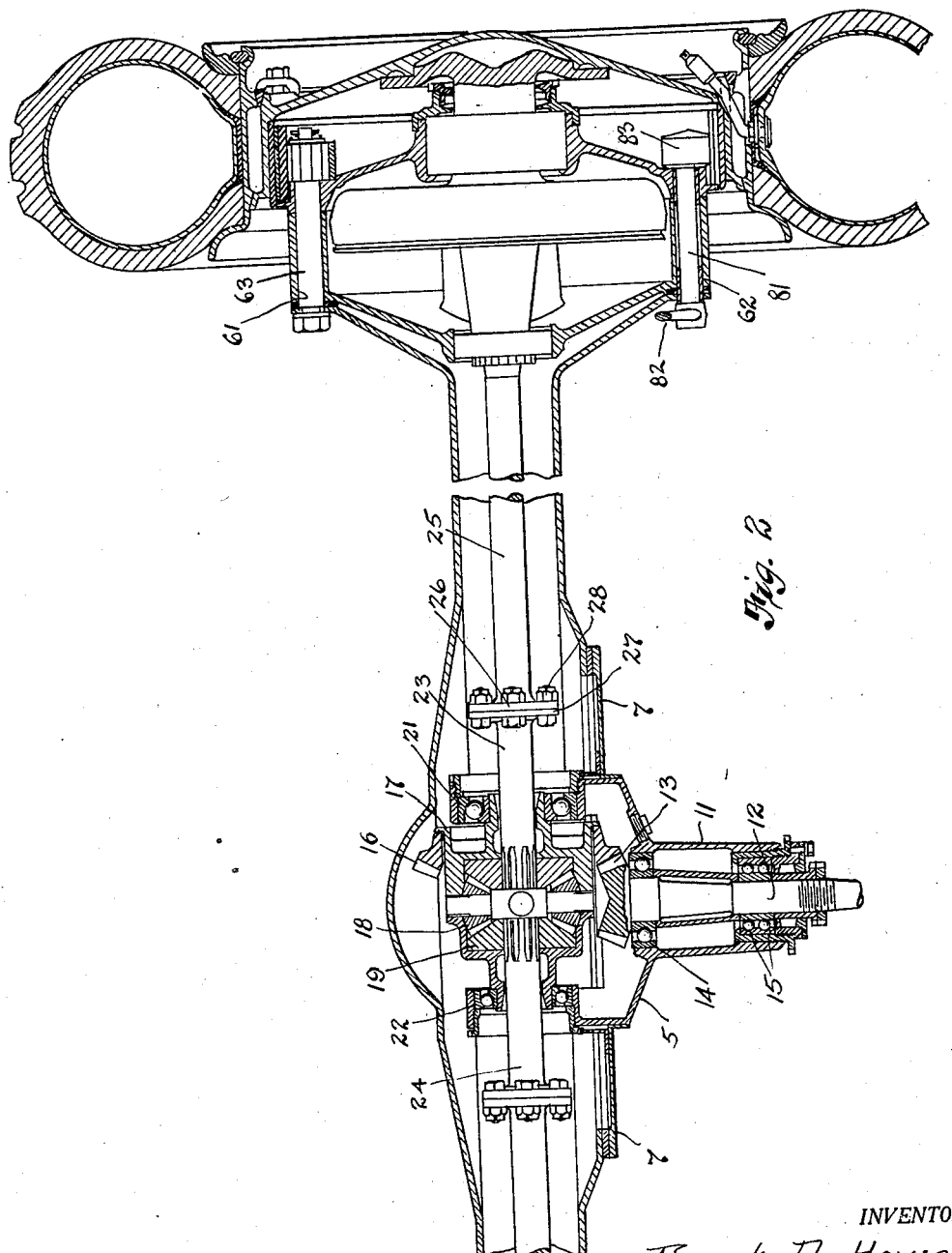
Figure 3:
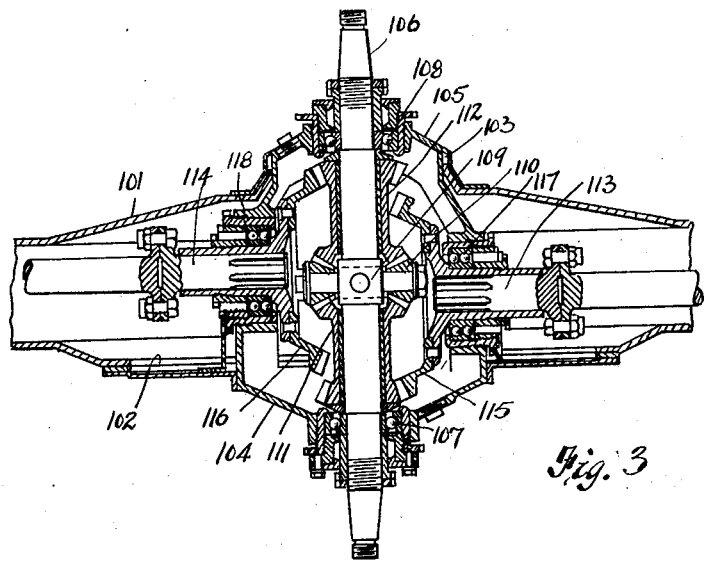
Figure 4:
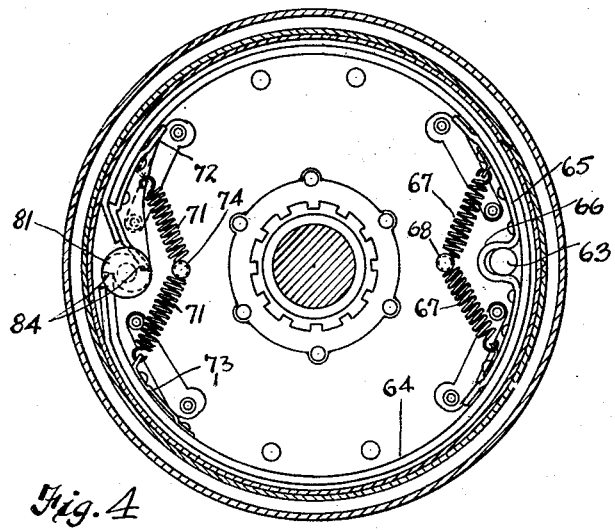

Fig. 1 is an elevation showing the central portion of the improved axle and one end thereof with the wheel applied thereto, the last named parts being shown in section; Fig. 2 is a horizontal sectional view of the central portion of the axle, together with one end thereof, with a wheel applied thereto; Fig. 3 is a horizontal sectional view showing the central portion of the axle structure as modified for use where a plurality of driving axles are to be employed; and Fig. 4 is a side elevation of the brake drum showing the details of the brake structure.

As is clearly shown in Fig. 1, the axle comprises a housing 1 having a flattened upper face 2, and having enlarged conical extensions 3 at either end. The forward face of said housing is provided with an opening 4 of substantial size and approximately elliptical outline within which the carrying frame 5 of the differential mechanism is adapted to be secured by means of a series of bolts 6. Said frame occupies the central portion of said opening and the end portions thereof are closed by means of cover plates 7 secured by means of suitable bolts 8 and 9 to the adjacent face of the housing and said frame, respectively. The carrying frame has a forward extension 11 within which the end of the driving shaft 12 carrying the driving pinion 13 is carried in suitable radial and thrust bearings 14 and 15, respectively. The driving pinion engages with the usual ring gear 16 which is secured to a hollow axle 17 enclosing the beveled pinions 18, 19, of the differential mechanism. Said hollow axle is supported upon suitable ball bearings 21, 22, which may be adjusted through the side plates 7 attached to the front face of the housing. The usual driving axle shafts 23, 24, have their inner ends firmly secured within the respective beveled pinions 19 and at their outer ends are supported in bearings 31 carrying a supporting plate secured to the end face of said housing. Said driving axles are preferably formed in two parts, the outer sections 25 being joined by means of integral flanges 26 upon said respective sections which are secured to each other by means of suitable bolts 28. Upon the outer ends of said driving axle shafts pinions 32 are secured, said pinions engaging with an internal gear 33 secured to the stub axle shafts 34 connected with the driving wheels of the vehicle. Said stub axle shafts are journaled in a pair of end plates 35, 36, carrying respectively the bearings 37, 38. These bearings are spaced a substantial distance from each other to insure the rigid supporting of said stub axle shafts and are mounted upon opposite sides of said internal gear. The outer ends of said stub axles are provided with an integral flange 41 carrying fastening bolts 42 whereby the disc wheels 43 of the vehicle are secured thereto. The discs of said wheels 43 are preferably made in the form of cones having domed apexes, said apexes being spaced apart from the stub axle flanges 41 and tending to strengthen the resistance of wheel discs 43 and flanges 41 against side thrusts acting at the wheel rims. Said wheels are provided with the usual flanges 44 upon which are seated the conventional tire supporting rims 45. The inner and outer end plates 35, 36, are secured to the ends of the axle in any desired manner. If the central housing is made a casting the inner plates may be cast integrally with it. The inner end plates 35 are each provided adjacent their upper and lower edges with enlargements 51 against which the flanged extensions of the axle housing rest. Said enlargements are suitably apertured to receive the stud bolts 52 upon which the springs connecting the axle with the frame of the vehicle, are secured. Said studs are provided with suitable oil grooves 53 and have screw-threaded ends 54 by means of which they are firmly seated in said enlargements. Set screws 55 serve to hold said studs rigidly in their adjusted positions. At points intermediate of the enlargements supporting the stud bolts for the springs, sleeves 61, 62, are provided. Within the sleeve 61 a bolt 63 is provided supporting at its inner end the brake band 64, which has connected to its inner face a strap 65 having a suitably shaped central portion 66 extending about said bolt. Springs 67 secured to the ends of said strap and to a pin 68 on the brake drum serve to retract the brake band when the braking pressure is released. Similar springs 71 are connected with short straps 72, 73, attached to the free end of the brake band and likewise serve to retract the brake band when the braking pressure is relieved. Said springs are connected with a pin 74 upon the brake drum.

Within the sleeve 62 the operating shaft 81 of the brake is journaled. Said shaft has a crank arm 82 operated in the usual manner by hand lever or foot pedal and suitable connections and at its inner end carries an enlargement provided with a pair of brake band expanding cams 84.

Immediately inside of the flange on the stub axle shaft a cover plate 91 is secured by means of suitable bolts 92. A dust ring 93 is secured within said cover plate so as to form a substantially dust-proof closure for the ends of the axle. Thus it will be noted the construction provides an axle which has many advantages, particularly for use upon motor busses. The driving shafts operate in oil and the internal gear is rigidly held at the end of the axle housing. Any transverse or weaving strains upon the wheel would not be transmitted in any large degree to the internal gear which is supported at an approximately central point between the bearings of the stub axle. The wheels are readily detachable from the stub axle flanges and the construction provides for easy access to the parts for adjustment or repair. Oil placed in the central tubular section will flow through bearings 31 into the reduction gear housing, insuring ample lubrication.

If desired, the wheels may be keyed to extensions of the stub axles instead of being secured solely to the stub axle flanges.

The manner in which the axle may be modified for use in connection with the second driving axle is clearly disclosed in Fig. 3. In said figure the housing 101 is provided with openings 102 and 103, respectively, at its front and rear sides. The forward opening, corresponding with the opening disclosed in the axle heretofore described, has inserted therein a carrying frame or differential housing 104, which has a rearward extension 105 designed to pass through and register with the rearward opening through said axle housing. Within said carrying frame the driving shaft extension 106 is mounted in suitable bearings 107, 108, secured in the respective ends thereof. Centrally of said driving shaft extension a spider 109 carrying differential pinions 110 is provided, said pinions driving a pair of sleeves 111, 112, having integral beveled gears at each end and mounted for rotation upon said driving shaft extension on opposite sides of said spider. In the sides of the differential carrying frame the ends of the respective sections of the driving axle shafts 113, 114, are provided with ring gears 115, 116, respectively. Said driving axle shafts are mounted at their inner ends in bearings 117, 118, respectively, which are off-set from each other in a horizontal plane so that the ring gears carried by said shafts may mesh with the outer beveled gears of the respective sleeves 111, 112. With a differential mechanism of this type, the driving force of the axle will be applied through the beveled gears at the outer ends of each of the sleeves 111, 112, and being applied at opposite sides of the respective ring gears, will serve to drive both of the driving axle shafts in the same direction. By means of a further extension of the main driving shaft of the motor vehicle the power can be transmitted to a second axle of the type first described, for a second axle of the identical type which would be capable of still further transmitting the power.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an axle, the combination of a substantially tubular housing having enlarged end portions, a pair of plates secured to each of the ends of said housing in spaced relation to each other, bearings supported in each of said plates, a stub axle shaft rotatably mounted in said bearings at each end of the housing, a gear mounted on each of said stub axle shafts, and driving means extending to the respective ends of said tubular housing and engaging said respective gears.

2. In an axle, a hollow, load carrying housing having enlarged oil retaining end portions and a depressed central portion, bearings in said enlarged portions, inwardly projecting axially alined revolving wheel spindles carried by said bearings, driving gears mounted upon said spindles, driving pinions engaging said driving gears, differential gearing within the central portion of said housing and driving shafts within said housing connecting said differential gearing and said pinions, said shafts having axes in offset relation to each other.

3. In an axle, the combination of a substantially tubular housing having enlarged end portions, a pair of plates secured to each of the ends of said housing in spaced relation to each other, bearings supported in each of said plates, a stub axle shaft rotatably mounted in said bearings at each end of the housing, an internal gear mounted on each of said stub axle shafts, means on the outer end of said stub axle shafts for connection respectively to the wheels of an automobile, and driving means extending to the respective ends of said tubular housing and engaging said respective internal gears.

4. In an intermediate driving axle for vehicles having a plurality of pairs of driving wheels, a hollow, load carrying housing having enlarged oil retaining end portions and a depressed central portion, bearings in said enlarged portions, inwardly projecting axially alined revolving wheel spindles carried by said bearings, driving gears mounted upon said spindles, driving pinions engaging said driving gears, differential gearing within the central portion of said housing and driving shafts within said housing connecting said differential gearing and said pinions, said shafts having axes in offset relation to each other, a bevel driving gear attached to the inner end of each of said shafts, and a transverse straight through shaft having bevel pinions engaging each of said bevel gears.

5. In an intermediate driving axle for vehicles having a plurality of pairs of driving wheels, a hollow, load carrying housing having enlarged oil retaining end portions and a depressed central portion, bearings in said enlarged portions, inwardly projecting axially alined revolving wheel spindles carried by said bearings, driving gears mounted upon said spindles, driving pinions engaging said driving gears, differential gearing within the central portion of said housing and driving shafts within said housing connecting said differential gearing and said pinions, said shafts having axes in offset relation to each other, a bevel driving gear attached to the inner end of each of said shafts, and a transverse straight through shaft having bevel pinions engaging each of said bevel gears, and a differential gear on said transverse shaft between said pinions.

6. In an axle, a hollow, load carrying housing having enlarged ends and a depressed central portion, bearings in said enlarged end portions, inwardly projecting axially alined revolving wheel spindles carried by said bearings, driving gears upon said spindles, driving pinions engaging said gears, shafts supporting said pinions and extending to the central part of said housing, said shafts having axes in offset relation to each other, bevel gears on the inner ends of said shafts, a transverse shaft extending through the central part of said housing and bevel pinions on said transverse shaft and engaging said bevel gears.

7. In an axle, the combination of a substantially tubular housing having enlarged end portions, a pair of plates secured to each of the ends of said housing in spaced relation to each other, bearings supported centrally of each of said plates, a stub axle shaft rotatably mounted in said bearings at each end of the housing, an internal gear mounted on each of said stub axle shafts, a flanged plate terminal carried on the outer end of each of said stub axle shafts for securing the same respectively to the wheels of an automobile, and driving means extending to the respective ends of said tubular housing and engaging said respective internal gears.

8. In an axle, a center load-carrying part having a continuous opening from end to end, an enlarged end portion in offset relation to said center part and freely communicating therewith through a large open passageway, a load supporting cover member forming with said end portion an oil-retaining gear housing, a bearing mounted in said cover member, and a wheel driving axle shaft journaled in said bearing.

9. In an axle, a center load-carrying part having a continuous opening from end to end, an enlarged end portion in offset relation to said center part and freely communicating therewith through a large open passageway, a load supporting cover member forming with said end portion an oil-retaining gear housing, a short outward tubular extension centrally of said cover member, a bearing mounted in said extension and a wheel driving shaft journaled in said bearing.

10. An intermediate driving axle for vehicles having a plurality of pairs of driving wheels, having in combination an axle housing, a revolving stub axle shaft at each end thereof, bearings supporting said shafts, a gear mounted on each of said shafts between said bearings, a pinion engaging each of said gears, a bevel gear, a drive shaft attached to each of said pinions at its outer end and to said bevel gear at its inner end, said separate drive shafts having axes in offset relation to each other, and a main drive shaft having beveled pinions engaging said bevel gears.

11. An intermediate driving axle for vehicles having a plurality of pairs of driving wheels, having in combination, an axle housing, a revolving stub axle shaft at each end thereof, bearings supporting said shafts, a gear mounted on each of said shafts between said bearings, a pinion engaging each of said gears, a bevel gear, a drive shaft attached to each of said pinions at its outer end and to said bevel gear at its inner end, said separate drive shafts having axes in offset relation to each other, and a drive shaft extending through said housing transversely of said longitudinal shafts and carrying bevel pinions engaging said bevel gears.

Signed by me, this 3rd day of October, 1923.

FRANK D. HOWE.